April 21, 1970 — D. E. SABLE — 3,507,525
MEANS FOR SECURING TWO MEMBERS TO ONE ANOTHER
Filed Dec. 22, 1966

INVENTOR
Donald E. Sable

United States Patent Office 3,507,525
Patented Apr. 21, 1970

3,507,525
MEANS FOR SECURING TWO MEMBERS
TO ONE ANOTHER
Donald E. Sable, 4413 Windsor Parkway,
Dallas, Tex. 75205
Filed Dec. 22, 1966, Ser. No. 603,902
Int. Cl. F16d 1/06; F16c 3/02
U.S. Cl. 287—52
4 Claims

ABSTRACT OF THE DISCLOSURE

A stop mountable on sucker rods of a sucker rod string of a well pumping apparatus for limiting longitudinal movement of paraffin scrapers on the rod and comprising a U-shaped resilient metal clip having a flanged liner which swells as it absorbs fluids.

---

This invention relates to a method for securing a member rigidly on a rod shaped structure and to a means for securing a member on the structure.

An object of this invention is to provide a new and improved method for securing a member, such as a steel clip, of sectional cylindrical configuration, on a rod shaped structure, such as a sucker rod of a sucker rod string to provide a stop for scrapers movably mountable on the sucker rod.

Another object is to provide a means for securing a member, such as the clip, on a rod shaped structure which holds the clip out of contact with the structure.

A main object of the invention is to provide a new and improved stop for sucker rods of a sucker rod string of a pumping apparatus for a well for limiting movement of the sucker rod string relative to paraffin scrapers movably mounted on the sucker rods.

Another object is to provide a stop for a sucker rod which does not weaken the rod either due to the operations performed during the installation of the stop on the rod or to electrolytic action between the rod and the stop while in the well.

Still another object is to provide a stop which includes liner of an electrically non-conductive resilient substance having a low coefficient of thermal conductivity and a resilient metal clip mounted on the liner and compressing the liner against the rod to hold the liner and the rod against movement relative to the rod.

A further object is to provide a stop for a sucker rod wherein the liner is of substantially cylindrical shape and slit longitudinally at one location to permit the mounting of the liner on the sucker and wherein the clip is formed into a substantially tubular cylindrical shape about the liner and rigidly secured at its longitudinally adjacent free end portions, as by a weld, while held compressed against the liner.

A still further object is to provide a stop for a sucker rod wherein the liner is provided with external flanges preventing contact between the stop and scraper mounted on the rod above or below the stop and movable on the rod.

Additional objects and advantages of the invention will be readily apparent from the reading of the following description of a device constructed in accordance with the invention, and reference to the accompanying drawings thereof, wherein.

Figure 1:
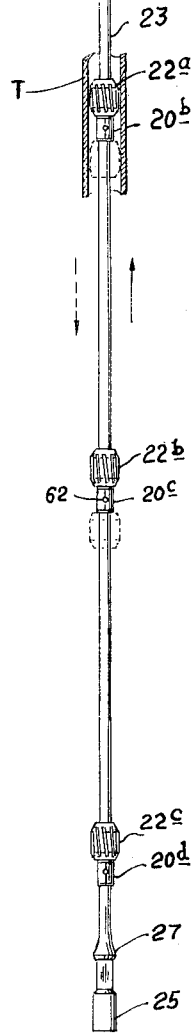
FIGURE 1 is a vertical view of a sucker rod provided with a stop embodying the invention for limiting longitudinal movement of scrapers movably mounted on the rod between the stops.
Figure 2:
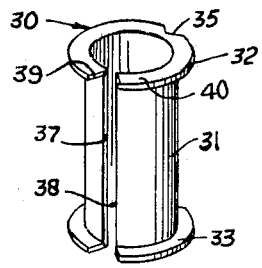
FIGURE 2 is a perspective view of the liner.
Figure 3:
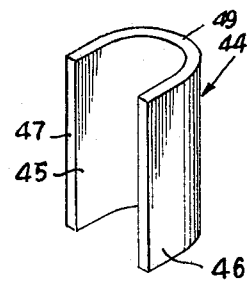
FIGURE 3 is a perspective view of a clip of a stop illustrated in FIGURE 1 prior to its positioning about the liner and sucker rod shank.

Referring now particularly to FIGURES 1 through 6 of the drawings, stops 20 embodying the invention are shown mounted on a sucker rod 21 which may be connected in a sucker rod string of a pumping apparatus, not shown, used to pump liquids from a well to the surface through a string of tubing T, the top end of the sucker rod string being connected to a suitable means for reciprocably moving the sucker rod string and its bottom end being connected to actuating means of a pump mounted in the lower end of the tubing by means of which well fluids are pumped upwardly through the tubing.

The stops 20 are secured to the sucker rod to limit the longitudinal reciprocable movement of the sucker rod relative to one or more scrapers 22 slidably mounted on the shank 23 of the sucker rod. Adjacent stops are spaced from one another a distance substantially equal to one-half or less of the length of the stroke or distance of reciprocable travel of the sucker rod string. The sucker rod has a threaded pin 24 at its top end and an internally threaded socket or box 25 at its bottom end. The rods of the sucker strings are connected by the threaded connection of the pin of one rod in the box of an adjacent rod.

The top and bottom stops 20a and 20d are mounted relatively short distances from the top and bottom flared portions 26 and 27 of the sucker rod. Each scraper is slidably mounted on the shank between a pair of the spaced adjacent stops. For example, the top scraper 22a is mounted between the stops 20a and 20b, the middle scraper 22b is mounted between the stops 20b and 20c, and the bottom scraper 22c is mounted between the stops 20c and 20d. The scrapers are mounted on the portions of the sucker rod string which extend through portions or zones of the well, and of the tubing, in which substances, such as paraffin, move out of solution in the well fluids and deposit on the internal surfaces of the tubing and on the sucker rods.

The scrapers 22 may be of the type commercially available under the trademark "PATCO" from the Positive Action Tool Company, Inc., of Oklahoma City, Okla., and their structure and the method of mounting on the sucker rods are fully described in the co-pending application of Donald E. Sable filed Sept. 30, 1965, Ser. No. 491,596 now Patent No. 3,364,998.

The stop 20 embodying the invention includes a liner 30 formed of a somewhat resilient electrically non-conducting substance having a low coefficient of thermal conductivity which, when exposed to moisture or well fluids, such as oil, absorbs such fluids and tends to swell. A substance suitable for making the liner and having the desired properties is the plastic available under the trade name "nylon." The liner 30 has a split substantially cylindrical body 31 provided with top and bottom external flanges 32 and 33. The flanges have substantially V-shaped slots 35 at locations diametrically opposed to the location of the slit or slot 36 of the body, defined by its longitudinal edge surfaces 37 and 38, to facilitate the placement of the liner on the shank 23, it being apparent that portions of the body on opposite sides of the slit flex resiliently outwardly along a longitudinal line diametrically opposed from the slit 36 as the liner is placed about a sucker rod shank by inserting the shank through its slit 36. The end edges of the flanges extend convergently inwardly to the longitudinal edge surfaces 37 and 38, respectively, and act as cam surfaces to facilitate further the placement of the liner on the shank.

The stop 20 also includes a metal clamp member or clip 44 of a strong resilient metal, such as steel, which initially is substantially U-shaped having longitudinal substantially parallel flat end portions 45 and 46 having longitudinal edge surfaces 47 and 48, respectively, which are connected by an arcuate or bight portion 49 having a radius of internal curvature substantially equal to the radius of the external surface of the body 31. The length of the clip is substantially equal to the distance between the bottom and top flanges 32 and 33 of the liner and its thickness is substantially equal to the width of the flanges.

The flexible liners are formed by a hot mold process and after they are removed from the mold in which they are made, are placed in air tight containers, such as sealed plastic bags, so that they are not exposed to moisture and remain in dry unswelled condition.

Figure 4:
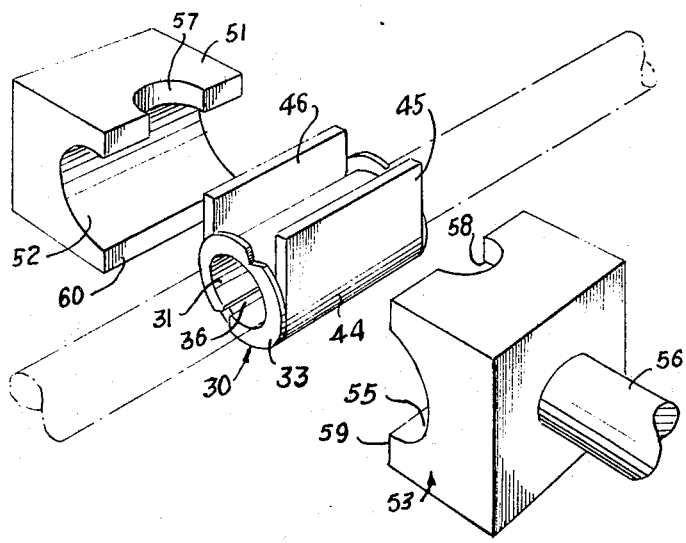
FIGURE 4 is a perspective, schematic view, showing a forming die apparatus for forming the U-shaped clip into a substantially cylindrical form and holding it compressed about the liner during the welding of the adjacent edges of the clip.

Each stop 20 is rigidly secured to the shank of a rod by first mounting the liner 30 soon after its removal from a sealed container and before it absorbs moisture to any substantial degree. The liner is placed on the shank at a desired location thereon and grips the shank, the internal diameter of the liner being substantially equal to or slightly smaller than the external diameter of the rod shank. The clip is then moved over the liner and between its flanges to a position, as illustrated in FIGURE 4, wherein the liner slit 36 is open to an internal surface of one of the side portions or bight portion of the liner. The parallel end portions 45 and 46 of the clamp member are then bent inwardly toward one another, as by a forming apparatus which may include a stationary member 51 having a semi-cylindrical recess 52 and a movable member 53 also having a semi-cylindrical recess 55 which faces and is axially aligned with and has the same radius of the curvature and the recess 48. The movable die member is mounted on the end of a reciprocable operator rod 56 secured to a suitable means, such as a piston of a hydraulic ram, which moves it toward and away from the fixed member. Die members 51 and 53 have slots 57 and 58, respectively, which, when the movable die member is moved into position wherein its side surface 59 abuts the facing side surface 60 of the fixed die member, define a circular aperture which opens to the recesses 59 and 60 which then define a forming cavity of substantially circular cross section whose length is equal to or slightly smaller than the distance between the liner flanges 32 and 33.

As the movable die member moves toward the fixed die member, the rod shank, the liner and the clip are held in alignment with the die member recesses so that the side portions 45 and 46 of the clip are bent inwardly toward one another and the clip is bent into, and held by the die members in, a substantially cylindrical form with the longitudinal edges 47 and 48, however, spaced from one another when the side surfaces 59 and 60 of the die members move into close proximity with, or actually engage, one another. The die members hold the liner body 31 compressed between the rod shank and the clip. The end flanges 32 and 33 of the liner are disposed outwardly of opposite ends of the die members and are not engaged thereby.

A suitable welding apparatus, such as an electric arc welder, is then employed to form a weld 62 which bridges the space between the longitudinal edges 47 and 48 and secures the free end portions of the clip to one another. Such electric arc welder requires that one side of an electric output circuit of the welder be connected to the clip which may be done by connecting such side to the fixed die member 52 which is of steel or other suitable electrically conductive substance. The other side of the electric output circuit is, of course, connected to the usual welding rod whose end may be inserted through the slots 57 and 58 to contact the clip. The resulting electric arc or current flowing between the end of the welding rod and the clip causes the end of the weld rod to melt and deposit in molten condition on the portions of the clip adjacent the longitudinal edges thereof and form the weld 62.

During the deposition of the weld 62, the clip is heated to a relatively high temperature and expands circumferentially since the die members hold it against radial expansion.

Figure 5:
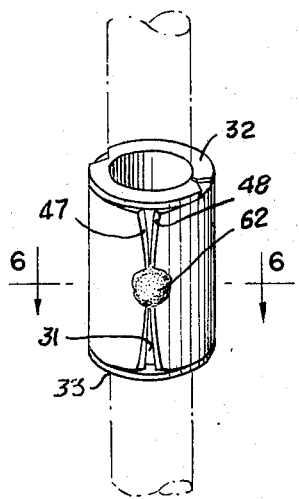
FIGURE 5 is a perspective view of the stop when mounted on a sucker rod shank.
Figure 6:
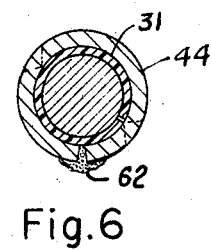
FIGURE 6 is a sectional view taken on line 6—6 of FIGURE 5.
Figure 7:
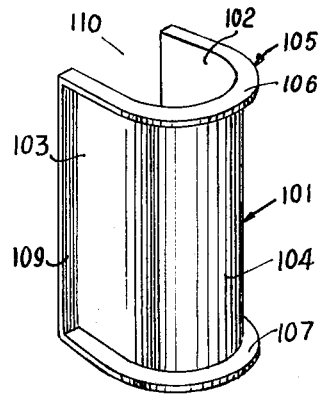
FIGURE 7 is a perspective view of a liner of a modified form of the stop embodying the invention.
Figure 8:
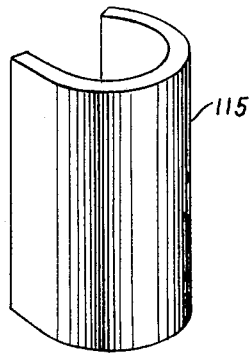
FIGURE 8 is a perspective view of a clip of the modified form of the stop.

The liner prevents any electric arcs between the welding rod and the sucker rod since nylon is an electric insulator. In addition, since the liner has a low coefficient of thermal conductivity very little heat transfer takes place from the clip to the sucker rod. The clip and liner are then held compressed by the die members until the weld cools and solidifies to rigidly secure the spaced free edge portions of the clip against movement from one another. As the clip cools, it tends to shrink or contract circumferentially and therefore radially and thus places the liner under further compression. The outer portions of the clip at the longitudinal edges 47 and 48 of the liner tend to move circumferentially outwardly of the weld, as illustrated in FIGURE 5, while the central portion, of course, is held against such movement by the weld.

The compressed liner now provides a very strong connection between the clip and the rod so that the stop is now held with great force against movement relative to the rod.

As the liner absorbs moisture or other well fluids, it tends to swell thus further increasing the force with which the stop is held rigid on the rod. The metal clip is spaced from the sucker rod shank so no electrolytic action can take place between the metal clip and the sucker rod when the rod is in the well. The liner flanges 32 and 33 now also prevent contact between the end edges of the clip and the end surfaces of scrapers which are formed of nylon or other suitable somewhat resilient substances mounted above and below such stop.

It will now be seen that the stop 20 embodying the invention includes a liner of a plastic substance, such as nylon, which has a low coefficient of thermal conductivity, which does not conduct electricity, which is somewhat resilient and which swells or expands as it absorbs fluids such as water, oil and the like. It will further be seen that the liner has a substantially cylindrical longitudinally split body mountable on a rod through such slit and that the stop includes a clip of a strong metal substance disposed about the liner body and holding the liner body in compression about the rod, the adjacent longitudinal edges of the clip defining its slit being secured to one another, as by a weld.

It will further be seen that the liner holds the clip spaced from and out of contact with the rod to which the stop is secured so that little or no electrolytic action can take place between the rod and the clip. It will further be seen that the liner limits transmittal of heat from the clip to the rod on which it is mounted during the welding of the adjacent edge portions of the clip to one another and also prevents electric arcing between the clip or an electric weld rod and the sucker rod during the electric welding of the clip edges.

It will now be seen that the new and improved method of securing one member, such as a clip, to another member, such as a sucker rod 23, includes positioning a liner of electrically non-conductive substance having a low coefficient of thermal conductivity on the rod, bending a clip into substantially cylindrical form on the liner to compress the liner against the rod, rigidly securing the adjacent edge portions of the clip to one another, as by welding, while the clip is raised to a high temperature and held in circumferentially expanded condition and compressed radially about the liner, and permitting the clip to cool and shrink to further compress the liner between the clip and the rod.

In FIGURES 7 through 13 of the drawings is illustrated a modified form of the stop embodying the invention shown mounted on the shank 23 of a sucker rod. The stop 100 includes a liner 101 of substantially U-shaped form having longitudinally extending substantially planar side portions 102 and 103 connected by a bight portion 104. A continuous external peripheral flange 105 of the liner includes horizontal bottom and top portions 106 and 107 which extend outwardly from the top and bottom edges of the liner and vertical portions 108 and 109 which extend outwardly from the longitudinal edges of the liner. The central axis of the inner surface of the bight portion 104 is equal to or somewhat smaller than the diameter of the member or rod shank 23 on which the stop is to be mounted. The bight portion has a width of more than 180 degrees so that the width of the throat or opening 110 between the planar end portions 102 and 103 is less than the diameter of the shank 23 and the end portions 102 and 103 will have to move outwardly relative to one another to permit the liner to be placed on the shank. The liner is preferably formed of nylon and is sufficiently resilient to permit such outward movement of the side portions.

The clamp member or clip 115 of the stop 100 is of steel or other resilient substance and constitutes a section of approximately 240 to 260 degrees of a cylinder. The radius of internal curvature of the clip plus the thickness of the body of the liner is somewhat less than the radius of the rod shank 23.

Figure 9:
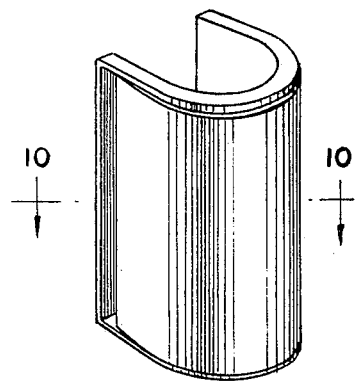
FIGURE 9 is a perspective view of the assembly of the liner and clip illustrated in FIGURES 7 and 8 prior to its installation on a sucker rod.
Figure 11:
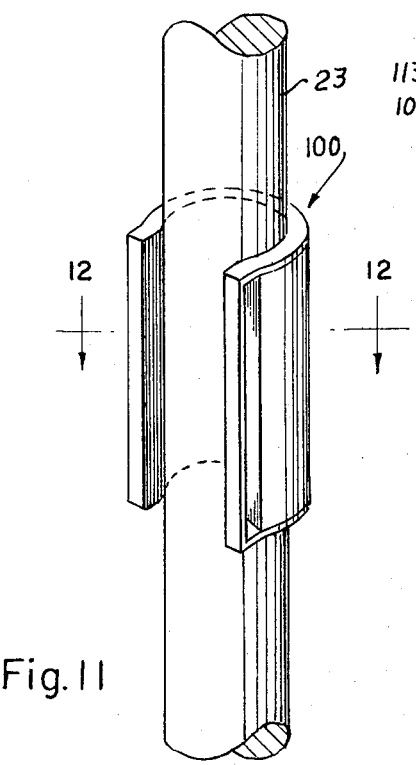
FIGURE 11 is a perspective view of the stop illustrated in FIGURE 9 mounted on a sucker rod shank; and, FIGURE 12 is a sectional view taken on line 12—12 of FIGURE 11.
Figure 10:
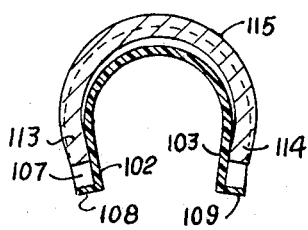
FIGURE 10 is a sectional view taken on line 10—10 of FIGURE 9.
Figure 12:
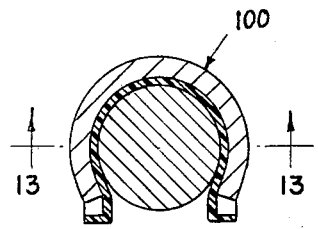
Figure 13:
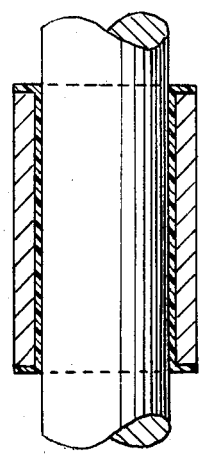
FIGURE 13 is a sectional view taken on line 13—13 of FIGURE 12.

The stop 100 is prepared for mounting by placing the clip on the liner, before the liner has absorbed any appreciable amounts of fluid, as illustrated in FIGURES 9 and 10. The assembly of the liner and clip is then forced onto the rod shank. The clip is somewhat smaller in length than the distance between the top and bottom flanges of the liner. As the rod shank enters the throat 110 of the liner, the side portions 102 and 103 of the liner are moved outwardly against the resistance both of the liner and of free longitudinal edge portions of the clip. The liner and the clip expand resiliently to permit movement of the rod shank thereinto and then move resiliently inwardly to the position illustrated in FIGURE 12. The liner at the areas of engagement thereof with the rod is compressed by the clip against the rod and the frictional force of its engagement with the rod and clip rigidly secures the clip and the liner on the rod. The degree of outward flexing of the edge portions of the clip is minimized by the resilience of the liner since the liner yields resiliently to permit the end edges to dig into the liner as they move past the central portion of the rod shank. As a result, the degree of flexure of the clip required to mount the stop on the rod is reduced and the clip is not stressed along its central longitudinal portion to such a degree that it would crack or fail either at the time of mounting or later. Should the clip be defective, any cracking thereof will be readily apparent at the time of the installation of the clip and such defective clip can be immediately replaced.

The liner is now compressed against a substantial external area of the rod and thus frictionally holds the stop against movement on the rod. As the substance of the liner absorbs moisture or well liquids, it tends to swell thus increasing the compressional force with which the stop is held or clamped on the sucker rod.

It will now be seen that the clip which is of metal is now held spaced from the metal sucker rod 23 thus preventing electrolytic action therebetween which could cause weakening of the rod at the location of the clip. The top flange portions 105 and 106 will now prevent contact between the clip and the scrapers to prevent undue wear of the surfaces of the scrapers as the sucker rod string is reciprocated in a tubing.

It will now be seen that the provision of a plastic liner not only serves to prevent any electrolytic action between the steel clip and the sucker rod which could weaken the rod and ultimately cause it to fail, which could result in the dropping of a great length of sucker rod strength in the well.

It will also be seen that the clip is not flexed to any great degree during the installation of the stop on the sucker rod since the resilient substance of which the liner is formed, such as nylon, yields rather than the hard steel as the free edges of the clip move past the center of the rod so that the gap or throat between its longitudinal edges may be relatively small and still not cause excessive bending or stressing of the clip during its installation with the liner.

It will be apparent that during the installation of the stop 20 the rod is protected both from excessive heat or arcing due to the interposition of the liner between the clip and the rod so that no portion of the rod is weakened.

It will further be seen that a new and improved method has been illustrated and described for securing a member, such as a clip, rigidly on a substantially round shaped structure, such as the shank of a sucker rod, which includes placing a resilient liner of a substance such as nylon, which swells as it absorbs fluids, about the structure while the liner is substantially free of such fluids, disposing the clip on such liner to compress the liner between the clip and the rod so that the liner will itself be held against movement on the structure, and further exposing the liner to fluids absorbable thereby whereby the compressional force exerted thereon is increased as the liner tends to swell.

It will also be apparent that while the method and the means for securing one member to another have been described and illustrated in connection with scraper stops for sucker rods, the method and means of the invention may be used in other installations and machinery wherein it is desired to rigidly secure one member to another without weakening at least one of the members as by excessive heating or wherein the members are subjected to continued vibrations which would tend to cause welds connecting the two members to crack or fail.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A stop for a sucker rod comprising: a liner of a resilient electrically non-conductive substance which swells as it absorbs fluids, and a unitary resilient metal clip positioned exteriorly of and on said liner for compressing the liner between said clip and a sucker rod shank, said liner having outwardly extending flange means, said clip being positioned between said flange means whereby edges of said metal clip are shielded by said flange means, said liner having a substantially U-shaped body, said flange means of said liner being a peripheral flange integral with the body of said liner.

2. A stop for a sucker rod comprising: a liner of a resiliently electrically non-conductive substance which swells as it absorbs fluids, and a unitary metal clip positioned on said liner for compressing the liner between said clip and a sucker rod shank, said liner having a substantially cylindrical body provided with a longitudinal slit, said clip being of substantially cylindrical form and having a longitudinal slit, said clip having adjacent longitudinal edges defining its slit and being rigidly secured to one another to hold said liner under compression, said liner having outwardly extending flange means at opposite ends thereof between which said clip is positioned.

3. The stop of claim 1, wherein said clip is of substantially sectional cylindrical shape.

4. The stop of claim 2, wherein said flange means of said liner have aligned slots opposed to its slit to permit outward flexing of opposite portions of said liner body.

References Cited

UNITED STATES PATENTS

| 260,462 | 7/1882 | Dodge et al. | 287—52.04 X |
| 404,300 | 5/1889 | Perkins | 287—52.04 X |
| 1,704,760 | 3/1929 | Parker | 138—99 |
| 1,730,158 | 10/1929 | Merrick. | |
| 1,888,588 | 11/1932 | Edwards. | |
| 2,259,023 | 10/1941 | Clark. | |
| 2,604,364 | 7/1952 | Ward | 287—52 X |

OTHER REFERENCES 332,914   7/1930   Great Britain.

REINALDO P. MACHADO, Primary Examiner

A. KUNDRAT, Assistant Examiner

U.S. Cl. X.R.

308—4